United States Patent
Xue et al.

(10) Patent No.: US 12,237,578 B2
(45) Date of Patent: Feb. 25, 2025

(54) DUAL-POLARIZED BROADBAND MILLIMETER-WAVE FILTERING ANTENNA BASED ON META-SURFACE, AND COMMUNICATION DEVICE

(71) Applicant: SOUTH CHINA UNIVERSITY OF TECHNOLOGY, Guangzhou (CN)

(72) Inventors: Quan Xue, Guangzhou (CN); Wanchen Yang, Guangzhou (CN); Wenquan Che, Guangzhou (CN); Jing Huang, Guangzhou (CN); Qiaguang Liu, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/562,202

(22) PCT Filed: Oct. 11, 2021

(86) PCT No.: PCT/CN2021/123017
§ 371 (c)(1),
(2) Date: Nov. 17, 2023

(87) PCT Pub. No.: WO2022/242014
PCT Pub. Date: Nov. 24, 2022

(65) Prior Publication Data
US 2024/0243482 A1    Jul. 18, 2024

(30) Foreign Application Priority Data
May 19, 2021   (CN) .......................... 202110543706.2

(51) Int. Cl.
*H01Q 1/48* (2006.01)
*H01Q 1/50* (2006.01)
(Continued)

(52) U.S. Cl.
CPC ........... *H01Q 15/0086* (2013.01); *H01Q 1/50* (2013.01); *H01Q 13/10* (2013.01); *H01Q 21/064* (2013.01)

(58) Field of Classification Search
CPC ...... H01Q 15/0086; H01Q 1/50; H01Q 13/10; H01Q 21/064
See application file for complete search history.

(56) References Cited

U.S. PATENT DOCUMENTS 10,938,091 B1   3/2021   Cho et al.
11,296,418 B2 *  4/2022  Zhang .................... H01Q 21/26
(Continued)

FOREIGN PATENT DOCUMENTS

CN   109037923 A   12/2018
CN   109524788 A    3/2019
(Continued)

OTHER PUBLICATIONS

Huang, Jing, et al.,"Millimeter-Wave Dual-Polarized Filtering Metasurface Antenna for 5G Applications," 2021 IEEE MTT-S International Wireless Symposium (IWS), Aug. 10, 2021, 3 pages.

*Primary Examiner* — Hai V Tran
*Assistant Examiner* — Bamidele A Immanuel
(74) *Attorney, Agent, or Firm* — MUNCY, GEISSLER, OLDS & LOWE, P.C.

(57) ABSTRACT

Disclosed in the present disclosure are a dual-polarized broadband millimeter-wave filtering antenna based on a meta-surface, and a communication device. The dual-polarized broadband millimeter-wave filtering antenna based on a meta-surface comprises two layers of dielectric substrates, which are arranged in a stacked manner, wherein an upper surface and a lower surface of a lower-layer dielectric substrate are respectively provided with an upper-layer metal ground and a lower-layer metal ground, an upper surface of an upper-layer dielectric substrate is provided
(Continued)

with a meta-surface structure, the meta-surface structure comprises N metal patches, which are arranged in an array, a slot is etched on each metal patch, the upper-layer dielectric substrate is connected to the upper-layer metal ground, and a Jerusalem cross slot is etched on the upper-layer metal ground. The antenna has a simple structure, and radiation and filtering can be realized at the same time without increasing the size of the antenna, thereby greatly reducing the volume of a radio-frequency front end and without any extra insertion loss.

6 Claims, 8 Drawing Sheets

(51) Int. Cl.
  *H01Q 13/10*    (2006.01)
  *H01Q 15/00*    (2006.01)
  *H01Q 21/06*    (2006.01)

(56) References Cited

U.S. PATENT DOCUMENTS

| | | | |
|---|---|---|---|
| 2017/0117633 A1* | 4/2017 | Park | H01Q 9/0428 |
| 2020/0153086 A1* | 5/2020 | Park | H01Q 9/0407 |
| 2021/0057823 A1* | 2/2021 | Zhang | H01Q 1/36 |

FOREIGN PATENT DOCUMENTS

| | | | | | |
|---|---|---|---|---|---|
| CN | 109860996 A | | 6/2019 | | |
| CN | 110148833 A | | 8/2019 | | |
| CN | 110380203 A | | 10/2019 | | |
| CN | 110416746 A | | 11/2019 | | |
| CN | 110474155 A | | 11/2019 | | |
| CN | 110854527 A | | 2/2020 | | |
| CN | 109449585 B | * | 5/2020 | | H01Q 1/38 |
| CN | 111430891 A | * | 7/2020 | | H01Q 1/36 |
| CN | 111799549 A | * | 10/2020 | | H01Q 1/36 |
| CN | 112038760 A | * | 12/2020 | | H01Q 1/38 |
| CN | 112072267 A | | 12/2020 | | |
| CN | 113410638 A | * | 9/2021 | | H01Q 1/48 |
| JP | 2001060824 A | | 3/2001 | | |

* cited by examiner

DUAL-POLARIZED BROADBAND MILLIMETER-WAVE FILTERING ANTENNA BASED ON META-SURFACE, AND COMMUNICATION DEVICE

FIELD OF THE INVENTION

The present disclosure relates to the field of antennas, and particularly, to a dual-polarized broadband millimeter-wave filtering antenna based on a meta-surface, and a communication device.

BACKGROUND OF THE INVENTION

With the development and application of 5G technology, massive multiple input multiple output (MIMO) antenna technology has become a key 5G technology. In order to integrate more radio frequency transceiver channels and antenna units in a limited space to achieve coexistence of multi-band systems, antenna systems are being developed towards miniaturization, low power consumption, and multiple bands. Antennas and filters are very important passive devices in a front end of a radio frequency system, so that their performance design is particularly important. In the traditional design, where the filters and the antennas are cascaded by directly using a matching device or a matching network, the overall size of the system is increased, and the insertion loss is increased, which seriously reduces the overall efficiency of the system. This problem is even more prominent in a 5G antenna system. To solve this problem, researchers at home and abroad have proposed to integrate the functions of two passive devices into one passive device, thus achieving both the filtering and radiation functions, namely a filtering antenna/filtenna. This scheme effectively reduces the overall size and the insertion loss, and is of great significance for improving the overall efficiency of a radio frequency front-end system.

Meanwhile, a 5G antenna array using the massive MIMO technology faces the design challenges of inter-array decoupling and miniaturization. The problem of coupling between antenna subarrays in different bands seriously affects a radiation pattern of the antenna array and deteriorates the performance of the array. A method for loading a duplexer or a decoupling network not only increases the loss, but also increases the overall size, which is not conducive to system integration. The filtering antenna, as a passive device with a bandpass effect, can achieve a good out-of-band suppression effect outside a passband of operation of the antenna, so that a good isolation effect can be achieved between antennas operating in different bands. Therefore, use of an array composed of filtering antenna units not only reduces the loss, but also meets the requirement for system miniaturization, which is of great significance for decoupling among different frequencies in a millimeter-wave band of 5G communication.

In the millimeter-wave band of the 5G communication, in order to achieve multi-functionality, miniaturization, and low power consumption of a system, integration of multiple system modules using a three-dimensional integrated vertical packaging technology has become a development trend. However, in the millimeter-wave frequency, a Q value of a filter is too small to be integrated into a chip, and an independent package also has the problem of high interconnection loss. Therefore, a filtering antenna design of "packaged integrated antennas" that can be applied in millimeter-wave and higher bands can become one of the methods to solve this problem.

SUMMARY OF THE INVENTION

In order to overcome the drawbacks and shortcomings in the prior art, the present disclosure first aims to provide a dual-polarized broadband millimeter-wave filtering antenna based on a meta-surface. The antenna can achieve a high gain and good filtering performance in a millimeter-wave band.

The present disclosure then aims to provide a communication device.

To achieve the first objective, the present disclosure adopts the following technical solutions:

The dual-polarized broadband millimeter-wave filtering antenna based on a meta-surface includes two layers of stacked dielectric substrates, wherein an upper surface and a lower surface of a lower-layer dielectric substrate are provided with an upper-layer metal ground and a lower-layer metal ground, respectively; an upper surface of an upper-layer dielectric substrate is provided with a meta-surface structure; the meta-surface structure includes N metal patches, which are arranged in an array; a slot is etched on each metal patch; the upper-layer dielectric substrate is connected to the upper-layer metal ground; and a Jerusalem cross slot is etched on the upper-layer metal ground.

Further, the dual-polarized broadband millimeter-wave filtering antenna based on the meta-surface includes a shorted metal branch and a metal shorted pin, wherein the shorted metal branch is arranged below the metal patches and in the upper-layer dielectric substrate; and one end of the metal shorted pin is connected to the shorted metal branch, and the other end is connected to the upper-layer metal ground.

Further, the meta-surface structure forms a 45-degree included angle with the Jerusalem cross slot.

Further, the meta-surface structure includes four metal patches; two L-shaped slots are etched on each metal patch; and the two L-shaped slots are symmetrical about a diagonal of the metal patch and are perpendicular to adjacent edges of the metal patch.

Further, the adding of the L-shaped slots shifts a higher-order mode of the meta-surface structure towards a low frequency to improve the roll-off property of a passband edge; and a high-frequency second zero point is introduced to improve a high-frequency out-of-band suppression level.

Further, arrangement directions of both the shorted metal branch and the metal shorted pin each form a 45-degree included angle with the Jerusalem cross slot.

Further, the dual-polarized broadband millimeter-wave filtering antenna based on the meta-surface includes two coplanar metal strip feeding lines, located directly below the Jerusalem cross slot, wherein the two metal strip feeding lines are orthogonal through a metal bridge of a short strip line.

Further, an isolation structure is adopted around the metal strip feeding lines and the Jerusalem cross slot.

Further, a spacing between adjacent metal patches is 0.01 $\lambda_g 0$ to 0.3 $\lambda_g 0$, wherein $\lambda_g 0$ is a dielectric effective wavelength corresponding to a center frequency of the antenna.

To achieve the second objective, the present disclosure adopts the following technical solutions:

A communication device includes the dual-polarized broadband millimeter-wave filtering antenna.

Compared with the prior art, the present disclosure has the beneficial effects below:

(1) The structure added by the present disclosure includes the shorted metal branch and the L-shaped slots. Without an additional filtering circuit, the volume and additional loss of a radio frequency front-end can be effectively reduced, so that the antenna has a compact structure.

(2) The present disclosure achieves a large bandwidth through slot-coupled feeding and a filtering structure with the shorted metal branch.

(3) In the present disclosure, through the metal meta-surface, the added shorted metal branch, and the added L-shaped slots, the antenna generates a plurality of radiation zero points in a specific frequency band, so that a stopband part obtains a good suppression level.

(4) In the present disclosure, by the adoption of a multi-layer low temperature co-fired ceramic (LTCC) technology, so that the structure is integrated, is easily interconnected to a back-end communication system assembly, and can be applied to a multi-functional fusion design of a 5G massive array.

DETAILED DESCRIPTION OF THE EMBODIMENTS

The present disclosure is further described in detail in combination with embodiments and accompanying drawings below, but implementations of the present disclosure are not limited herein.

Embodiment 1

Figure 1:
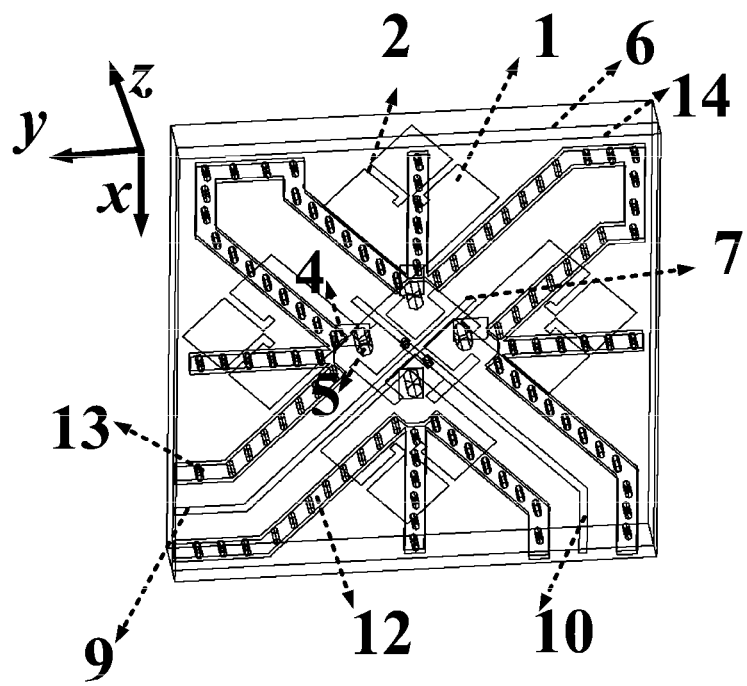
FIG. 1 is a schematic diagram of a three-dimensional structure of the present disclosure.
Figure 5:
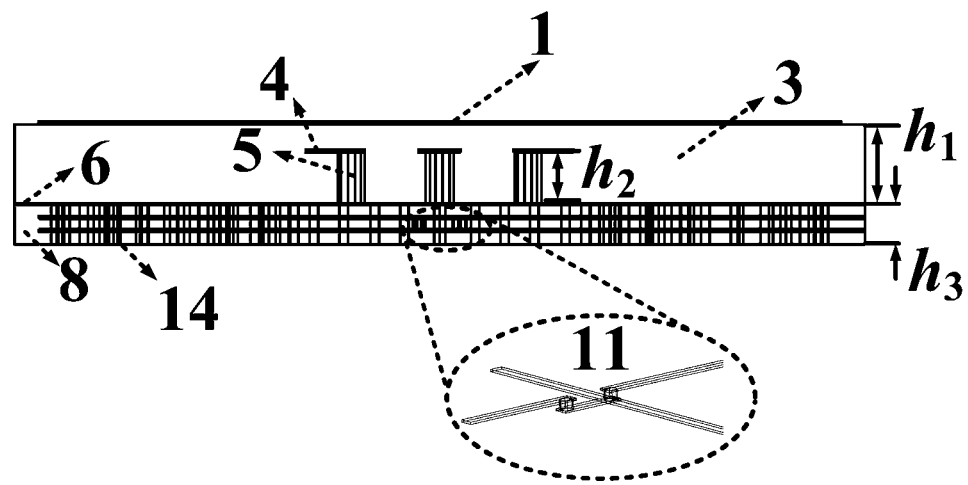
FIG. 5 is a side view of FIG. 1 of the present disclosure.

As shown in FIG. 1 and FIG. 5, a dual-polarized broadband millimeter-wave filtering antenna based on a meta-surface adopts an LTCC processing technology, and a thickness of each layer of an LTCC dielectric substrate is 0.094 mm. The dual-polarized broadband millimeter-wave filtering antenna based on the meta-surface includes two layers of stacked dielectric substrates, specifically an upper-layer dielectric substrate 3 and a lower-layer dielectric substrate 8. An upper surface of the upper-layer dielectric substrate is provided with a meta-surface structure 1; an upper surface and a lower surface of the lower-layer dielectric substrate are provided with an upper-layer metal ground 6 and a lower-layer metal ground 14, respectively. A shorted metal branch 4 is arranged in the upper-layer dielectric substrate, and the shorted metal branch is connected to the upper-layer metal ground 6 through a metal shorted pin 5.

The shorted metal branch is not limited to an elongated branch, but can also be trapezoidal, T-shaped, and the like, An upper end of the metal shorted pin 5 can be located at any position on a centerline of the branch, and a lower end can be located on two sides of a Jerusalem cross slot 7 on the upper-layer metal ground 6. Arrangement directions of the shorted metal branch 4 and the metal shorted pin 5 form a 45° included angle with the Jerusalem cross slot 7 to obtain a zero point of a lower side frequency of a passband and improve in-band matching.

Figure 4:
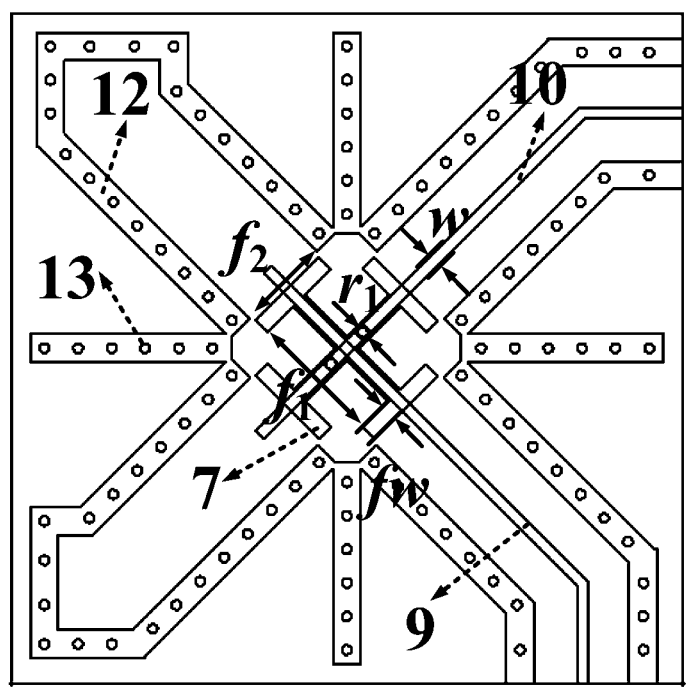
FIG. 4 is an exploded top view of FIG. 1, including a metal strip feeding line, a metal isolation strip, a metal isolation column, an upper-layer metal ground, and a metal bridge.

As shown in FIG. 4, a Jerusalem cross slot 7 is etched on the upper-layer metal ground 6, and a midpoint of the Jerusalem cross slot is located at a center position of the upper-layer metal ground. Two coplanar metal strip feeding lines 9 and 10 are arranged directly below the Jerusalem cross slot. To avoid crossing, crossing of the two feeding lines is achieved through a metal bridge 11 with two through holes and a short strip line. A metal isolation strip 12 and several metal isolation columns 13 are used around the metal strip feeding lines 9, 10 and the Jerusalem cross slot 7 to form an isolation structure, which avoids diffusion of a feed signal.

Figure 2:
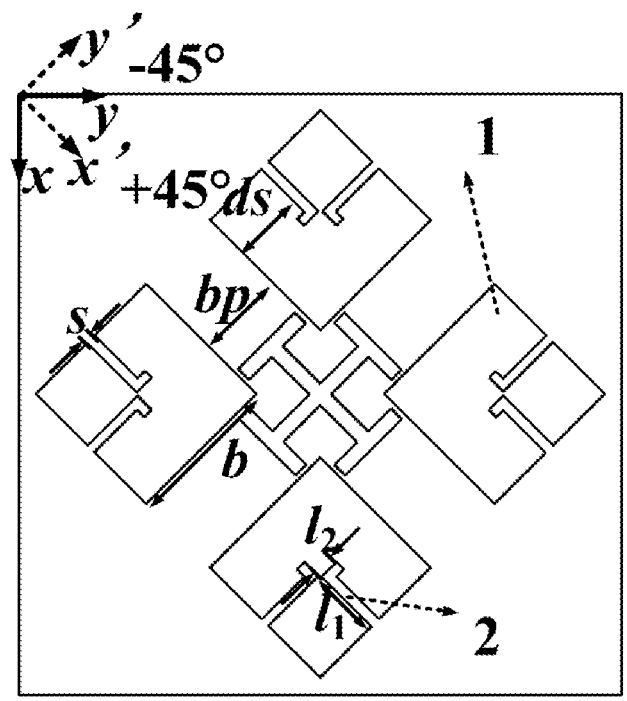
FIG. 2 is an exploded top view of FIG. 1, including a meta-surface structure etched with L-shaped slots, and an upper-layer metal ground.

The meta-surface structure includes N metal patches arranged in an array, and the metal patches are rectangular patches. In this embodiment, N is equal to 4, and the metal patches are arranged in a 2*2 array. The four metal patches are arranged at equal intervals, with a center point being a center of the upper-layer dielectric substrate. The meta-surface structure is arranged at a 45° included angle with the Jerusalem cross slot 7 to obtain a first zero point of an upper side frequency of the passband. Two L-shaped slots 2 are etched on each metal patch, and a shape of each slot can vary, including a straight line shape, a U shape, and the like. The two L-shaped slots are symmetric about a diagonal, as shown in FIG. 2, and are perpendicular to adjacent edges of the metal patch to obtain a second zero point of the upper side frequency on the passband. The adjacent edges can be adjacent inner-side edges close to the center point of the upper-layer dielectric substrate, or can be adjacent outer-side edges away from the center point.

Figure 3:
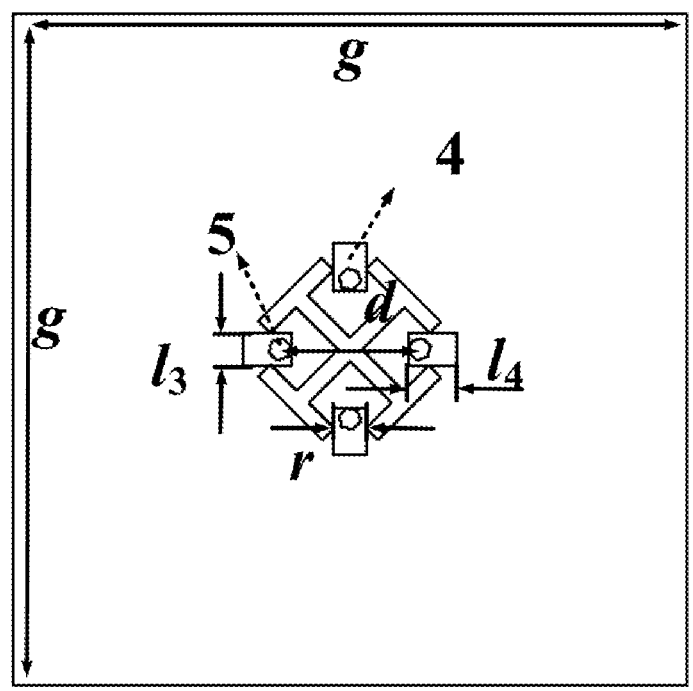
FIG. 3 is an exploded top view of FIG. 1, including a shorted metal branch, a metal shorted pin, and an upper-layer metal ground.

As shown in FIG. 3, there are a total of four shorted metal branches 4, located directly below the metal patches. The shorted metal branches are rectangular and are connected to the upper-layer metal ground 6 through the metal shorted pins 5. Lower ends of the metal shorted pins 5 are located on the two sides of the Jerusalem cross slot 7 on the upper-layer metal ground 6. There are four metal shorted pins centrosymmetrically arranged close to a center point of the antenna. The arrangement directions of both the shorted metal branches 4 and the metal shorted pins 5 each form a 45° included angle with the Jerusalem cross slot 7 to obtain a zero point of a lower side frequency of the passband and improve in-band matching.

Further, dielectric constants se of the upper and lower dielectric substrates are 2 to 7. The dielectric substrates and the metal grounds are both square and have a side length g of $0.2\lambda$ to $1.5\lambda$, where $\lambda$ is a free space wavelength corresponding to a center frequency. The lengths of the two sides of the metal grounds can be selected freely within the above range according to a size requirement of the antenna. These values can achieve a filtering function of stopband suppression.

Further, a spacing $h_1$ between the meta-surface structure and the upper-layer metal ground is $0.05\lambda$ to $0.2\lambda$, where $\lambda$ is a free space wavelength corresponding to a center frequency. The spacing between the meta-surface structure and the upper-layer metal ground can be freely selected within the above range according to a bandwidth requirement and processing implementation capability of the antenna. It can achieve the filtering function of stopband suppression.

Further, a spacing $h_2$ between the shorted metal branches and the upper-layer metal ground is $0.008\lambda$ to $0.15\lambda$, where $\lambda$ is a free space wavelength corresponding to a center frequency. The spacing between the shorted metal branches and the upper-layer metal ground can be freely selected within the above range according to a bandwidth requirement of the antenna. It can achieve the filtering function of stopband suppression.

Further, a spacing $h_3$ between the upper-layer metal ground and the lower-layer metal ground is $0.05\lambda$ to $0.15\lambda$, where $\lambda$ is a free space wavelength corresponding to a center frequency. The spacing between the upper-layer metal ground and the lower-layer metal ground can be freely selected within the above range according to a bandwidth requirement of the antenna. It can achieve the filtering function of stopband suppression.

Further, a side length b of each metal patch is $0.2 \lambda g0$ to $0.7 \lambda g0$, where $\lambda g0$ is a dielectric effective wavelength corresponding to a center frequency of the antenna. The side length of the metal patch can be configured to adjust impedance matching in the passband and a frequency at the first zero point of the upper side frequency of the passband. The side length is determined by the thickness of the dielectric substrate, the dielectric constant, and the spacing between the patch of the metal meta-surface and the upper-layer metal ground. The filtering function of stopband suppression can be achieved within the above range.

Further, a spacing bp between adjacent metal patches in the meta-surface structure is $0.01 \lambda g0$ to $0.3 \lambda g0$, where $\lambda g0$ is a dielectric effective wavelength corresponding to a center frequency of the antenna. The spacing between the metal patches can be configured to adjust impedance matching in the passband, a frequency at the first zero point of the upper side frequency of the passband, and the suppression performance of an upper stopband. The spacing is determined by the thickness of the dielectric substrate, the dielectric constant, and the spacing between the patch of the metal meta-surface and the upper-layer metal ground. The filtering function of stopband suppression can be achieved within the above range.

Further, a slot position ds etched on an outer edge of each metal patch is $0.02 \lambda g0$ to $0.68 \lambda g0$, and slot lengths $l_1$ and $l_2$ are $0.02 \lambda g0$ to $0.68 \lambda g0$, where $\lambda g0$ is a dielectric effective wavelength corresponding to a center frequency of the antenna. The position and length of the slot can be configured to adjust impedance matching in the passband, a frequency at the second zero point of the upper side frequency of the passband, and the suppression performance of the upper stopband. The position and length of the slot are determined by the thickness of the dielectric substrate, the dielectric constant, and the spacing between the patch of the metal meta-surface and the upper-layer metal ground. The filtering function of stopband suppression can be achieved within the above range.

Further, a length $l_4$ of the shorted metal branch is $0.02 \lambda g0$ to $0.36 \lambda g0$, and a width $l_3$ is $0.02 g0$ to $0.18 \lambda g0$, where $\lambda g0$ is a dielectric effective wavelength corresponding to a center frequency of the antenna. The length and width of the shorted metal branch are configured to adjust the impedance matching in the passband, the frequency of the zero point of the lower side frequency of the passband, and the suppression performance of a lower stopband. The shorted metal branches are equivalent to a stopband effect of shunt ¼ $\lambda g0$ shorted stub, which generates a zero point of a lower side frequency of the antenna. The length of the shorted metal branch is mainly determined by the thickness of the dielectric substrate, the dielectric constant, and the spacing between the shorted metal branch and the upper-layer metal ground. The filtering function of stopband suppression can be achieved within the above range.

The specific sizes in this embodiment are as follows:

The dielectric constants se of the upper and lower dielectric substrates are 5.9; the dielectric substrates and the metal grounds are square and have a side length g of 6 mm; the spacing $h_1$ between the meta-surface structure and the upper-layer metal ground is 0.564 mm; the spacing $h_2$ between the shorted metal branch and the upper-layer metal ground is 0.376 mm; and the spacing $h_3$ between the upper-layer metal ground and the lower-layer metal ground is 0.282 mm, where $\lambda$ is a free space wavelength corresponding to a center frequency, and $\lambda g0$ is a dielectric effective wavelength corresponding to a center frequency of the antenna. In this embodiment, $\lambda$ is 11.16 mm, and $\lambda g0$ is 4.6 mm.

The side length b of each metal patch is 1.55 mm; the spacing bp between the metal patches is 0.35 mm; the width s of each L-shaped slot is 0.1 mm; a distance ds between the slot and an edge of each patch is 0.75 mm; and the slot lengths $l_1$ and $l_2$ are 0.6 mm and 0.2 mm in sequence.

The length $l_3$ of each shorted metal branch is 0.42 mm, and the width $l_4$ is 0.28 mm. The center distance d of the metal shorted pins is 1.2 mm, and a diameter r is 0.2 mm.

A length $f_1$ of a middle portion of the Jerusalem cross slot etched on the ground is 1.3 mm; a length $f_2$ of each of two ends of the slot is 0.8 mm; a width fw is 0.1 mm; and a diameter $r_1$ of a metal column, used for connecting cross-layer feeding lines, in the metal bridge is 0.1 mm.

Figure 6A:
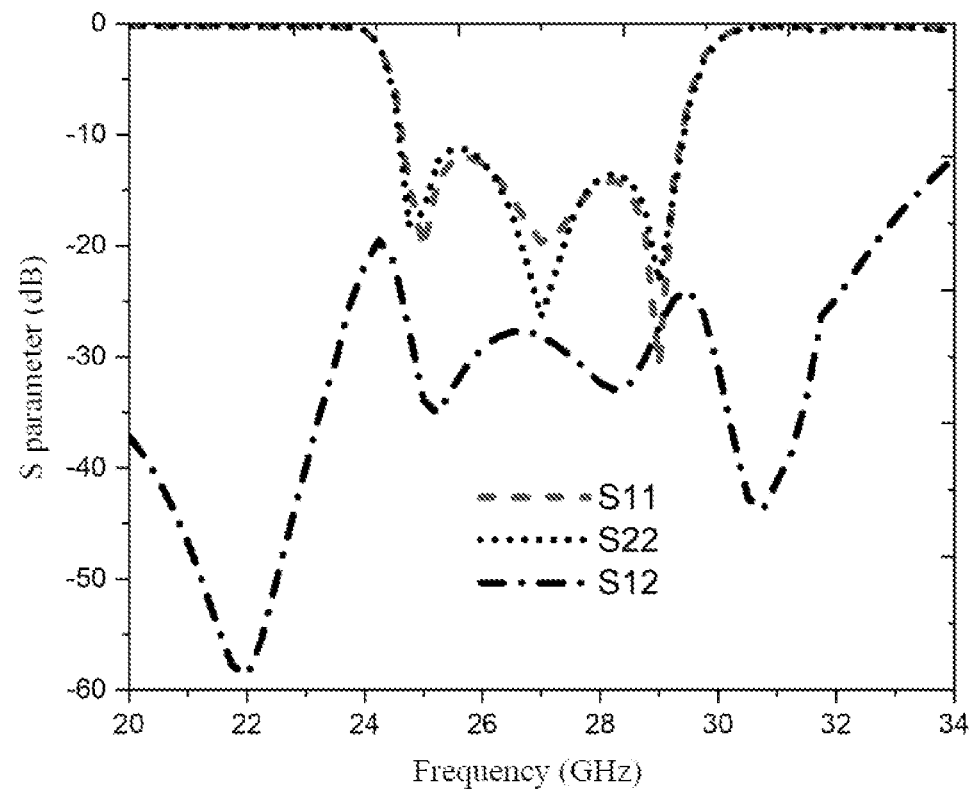
FIG. 6(a) is a schematic diagram showing that S parameters: a reflection coefficient and polarization isolation vary with a frequency according to the present disclosure.
Figure 6B:
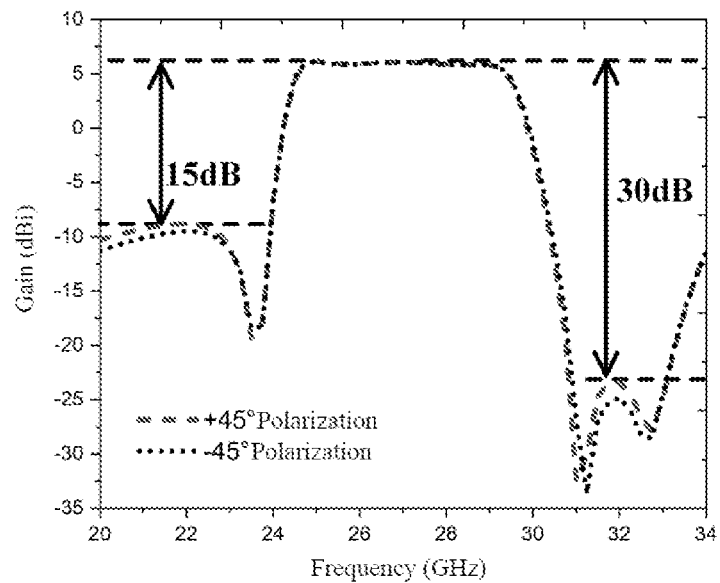
FIG. 6(b) is a schematic diagram showing that a gain varies with a frequency according to the present disclosure.
Figure 6C:
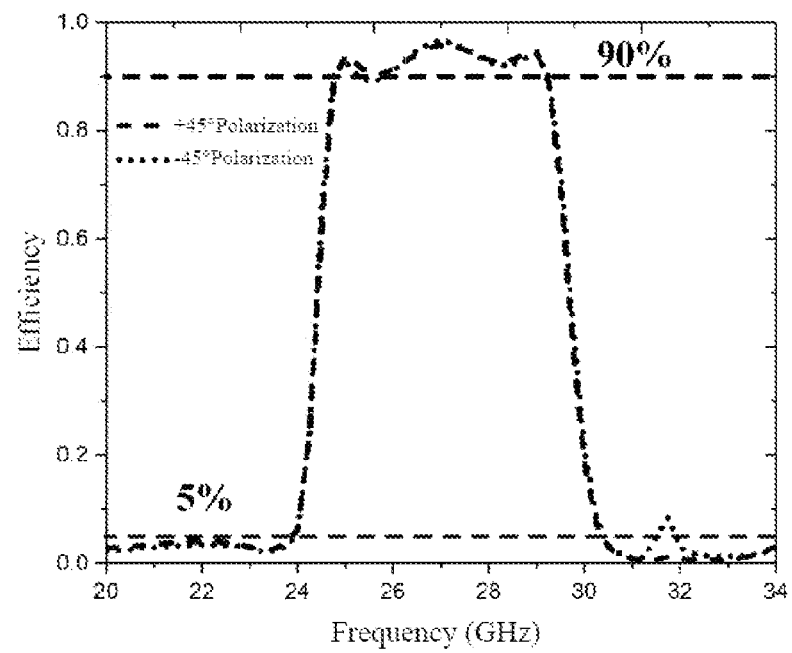
FIG. 6(c) is a schematic diagram showing that the efficiency varies with a frequency according to the present disclosure.

As shown in FIG. 6(a) to FIG. 6(c), the dual-polarized broadband millimeter-wave filtering antenna based on the meta-surface of this embodiment has a high stable gain in an operating band, with an average gain of 5.8 dBi and a maximum gain of 6.1 dBi. The radiation efficiency of the passband is above 90%, and the passband has good frequency selectivity at an edge of the operating band. The low-frequency out-of-band suppression is 15 dB; the high-frequency out-of-band suppression is 30 dB; and the stopband efficiency is less than 5%. The antenna is matched well at the center frequency and has a large impedance bandwidth of 19.5%, which fully covers millimeter-wave bands of 5G communications, and the in-band polarization isolation is greater than 25 dB.

Figure 7A:
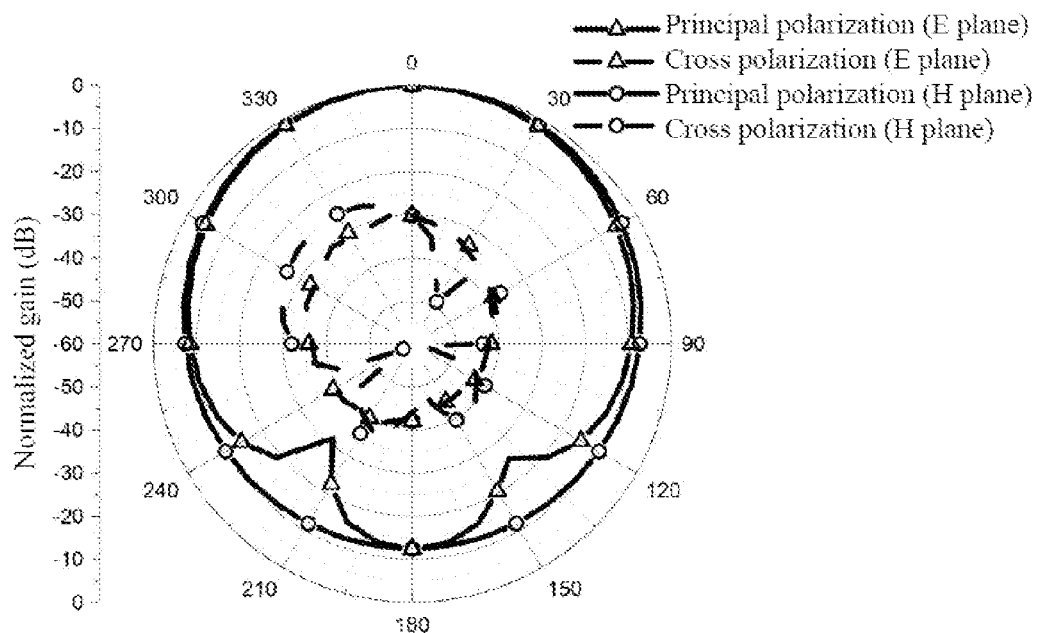
FIG. 7(a) is a schematic diagram of a radiation pattern with +45° polarization at 28 GHz of the present disclosure.
Figure 7B:
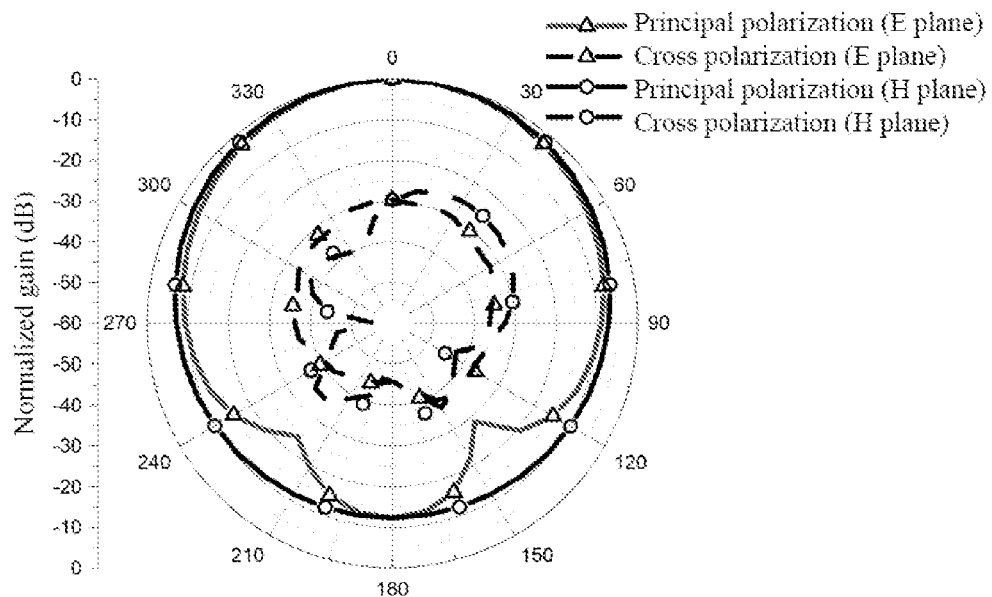
FIG. 7(b) is a schematic diagram of a radiation pattern with −45° polarization at 28 GHz of the present disclosure.

As shown in FIG. 7(a) to FIG. 7(b), the symmetry of a pattern of the dual-polarized broadband millimeter-wave filtering antenna based on the meta-surface of this embodiment in the passband is basically good, and a cross polarization level is less than −30 dB.

According to the dual-polarized broadband millimeter-wave filtering antenna based on the meta-surface provided by the embodiments of the present disclosure, a metal meta-surface is excited by coupling of the Jerusalem cross slot, and transmission zero points and additional resonance points in the passband are generated by adding the shorted metal branch and etching the L-shaped slots on the patch of the metal meta-surface, thereby achieving a broadband antenna with a filtering response.

Specifically, the shorted metal branches of this embodiment are equivalent to the effect of parallel ¼ λg0 short-circuit stub stopbands, which generates a zero point of a lower side frequency of the antenna. The metal meta-surface and the L-shaped slots etched on the patch of the meta-surface can achieve reversed current distribution on the patch to generate a zero point of an upper side frequency of the antenna, achieving a filtering response. A side band has good selectivity and good stopband suppression.

Figure 8A:
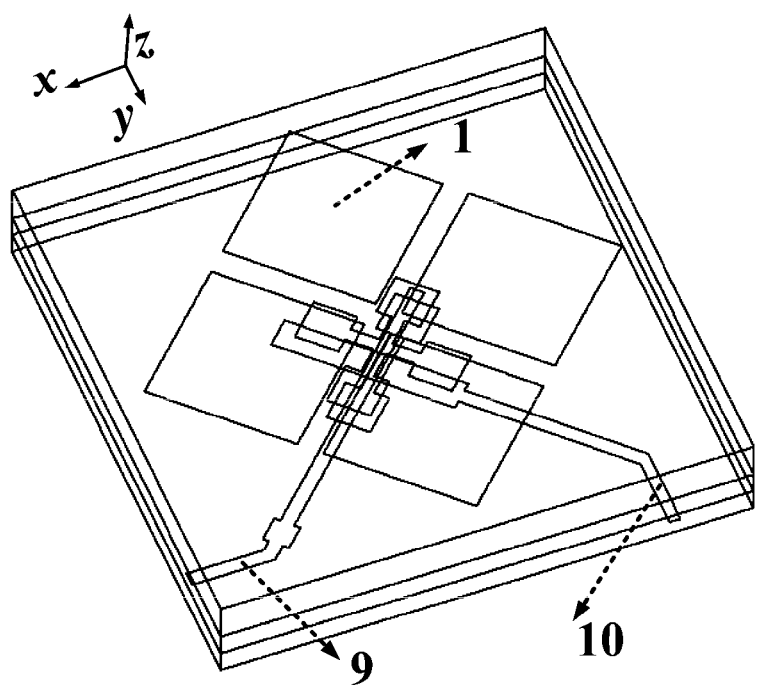
FIG. 8(a) is a schematic diagram of a contrast antenna I of the present disclosure.
Figure 8B:
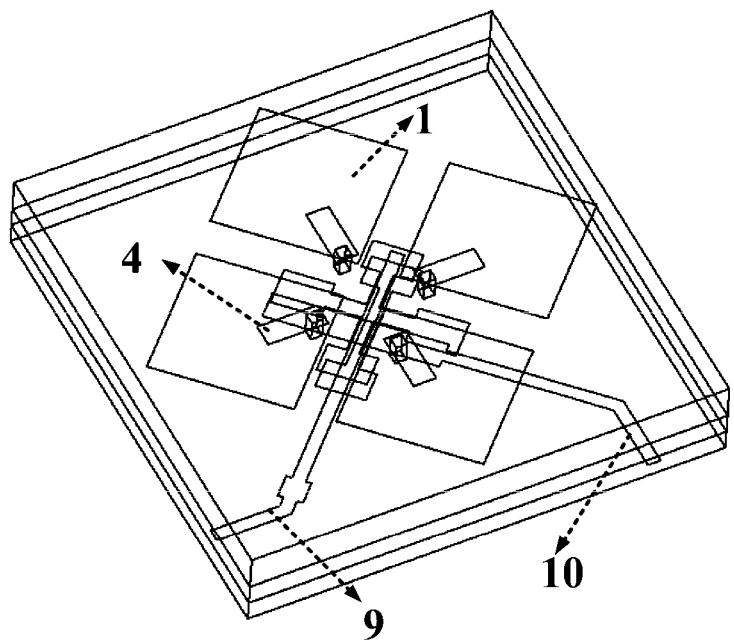
FIG. 8(b) is a schematic diagram of a contrast antenna II of the present disclosure.
Figure 8C:
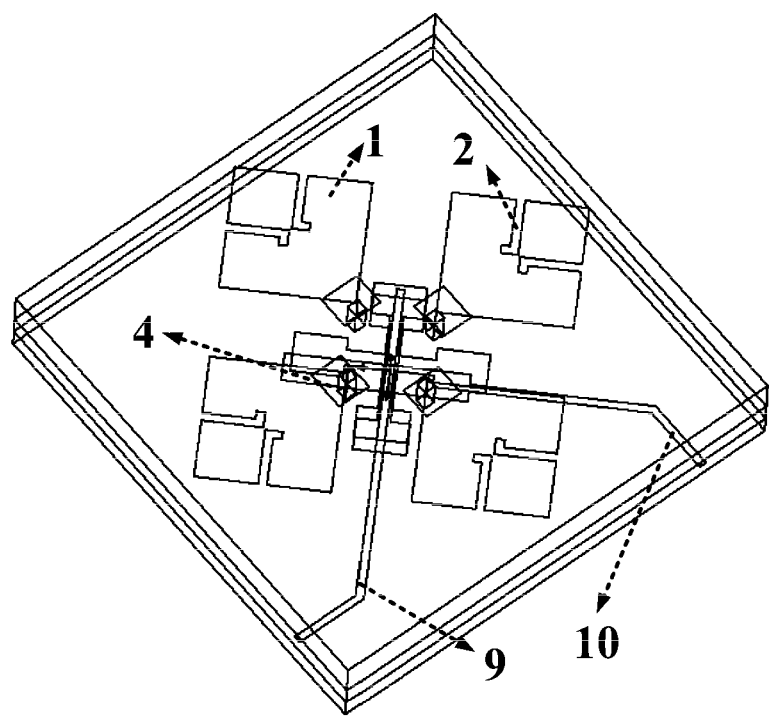
FIG. 8(c) is a schematic diagram of a contrast antenna III of the present disclosure.
Figure 9A:
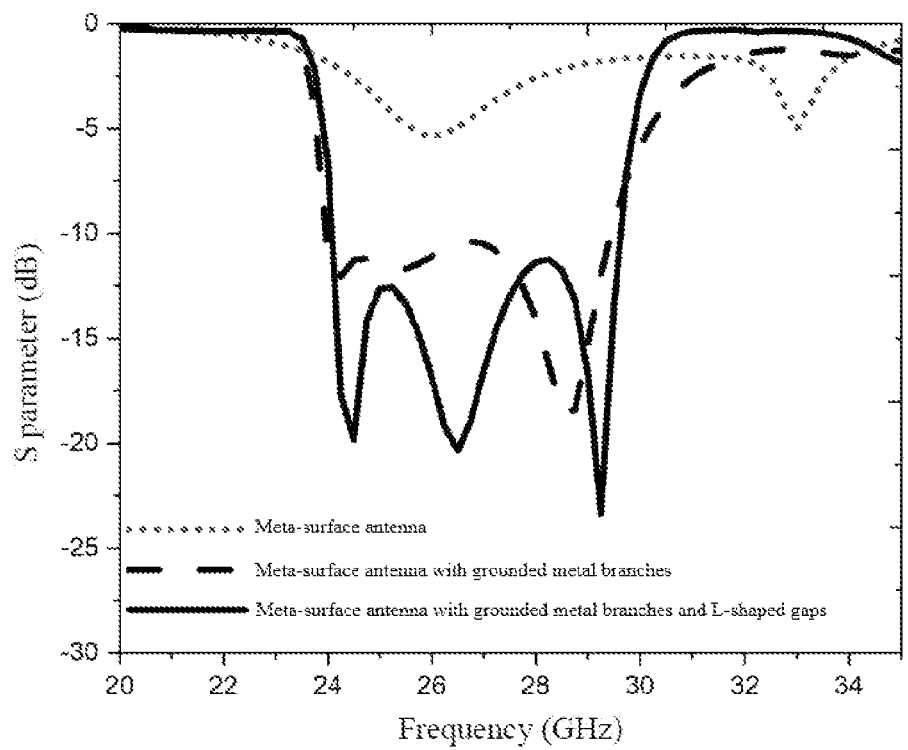
FIG. 9(a) is a schematic diagram showing that S parameters of three contrast antennas vary with a frequency according to the present disclosure.
Figure 9B:
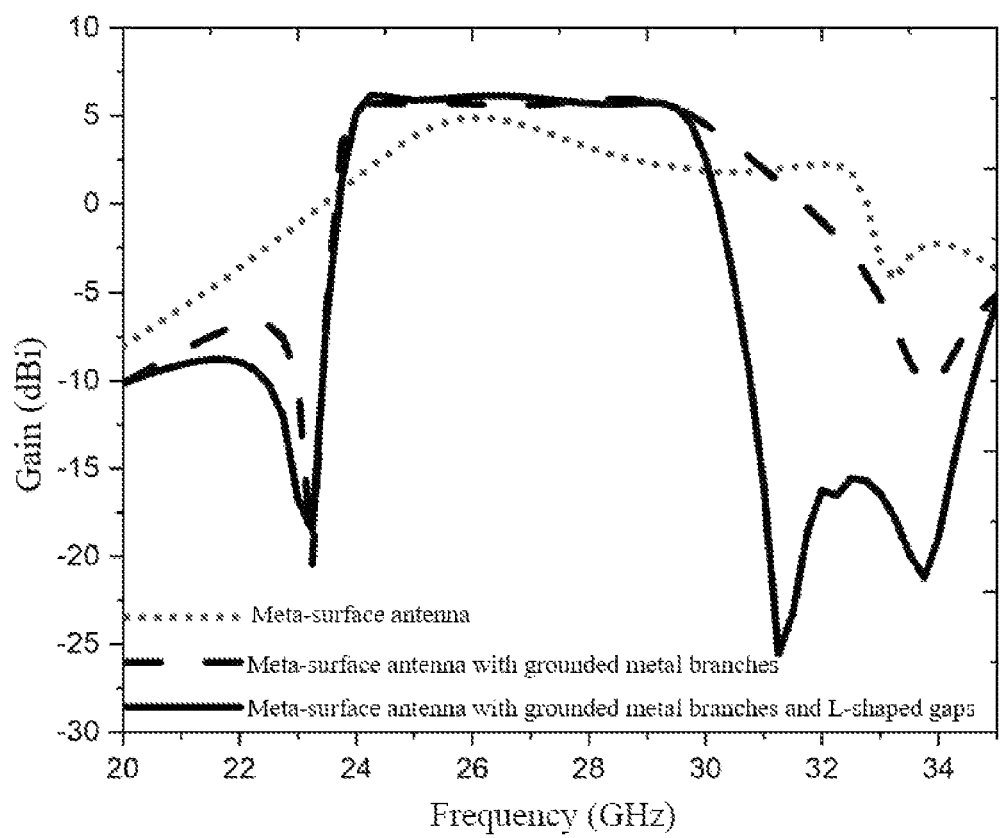
FIG. 9(b) is a schematic diagram showing that gains of three contrast antennas vary with a frequency according to the present disclosure.

For further explanation, antennas as shown in FIG. 8(a) to FIG. 8(c) have been added for comparison. An antenna I as shown in FIG. 8(a) only includes a meta-surface structure 1 with slot-coupled feeding. According to an antenna II shown in FIG. 8(b), based on the antenna I, shorted metal branches 4 and metal shorted pins 5 are added below the meta-surface structure 1. According to an antenna III in FIG. 8(c), based on the antenna II, L-shaped slots 2 are added on the meta-surface structure 1. It can be found in FIG. 9(a) to FIG. 9(b) that the meta-surface antenna with the slot-coupled feeding generates an upper sideband zero point at 33.25 GHz due to a reverse current distribution of a high-order mode. After the shorted metal branches are added, the antenna generates a lower sideband zero point at a low frequency of 23.25 GHz to form a lower stopband. After the L-shaped slots are etched on the patches of the meta-surface, the current distribution of the meta-surface is changed, so that a new upper sideband zero point is introduced at 32.75 GHz, and the original zero point at 33.25 GHz is shifted to 30.5 GHz. The edge roll-off property of an upper sideband and the upper stopband suppression are improved. Without adding an additional filter/resonator or filtering circuit of the antenna, the volume of a radio frequency front-end can be greatly reduced, and there is no additional insertion loss. In addition, the introduction of a filtering structure brings capacitive and inductive resonances, which can also affect the impedance of the antenna, thereby introducing resonance points in the passband and expanding the bandwidth of the antenna. The filtering performance can be achieved in a compact high-gain structure. The antenna has a simple structure and can achieve a ±45° dual polarization operation in an integrated structure. The antenna also has a filtering response with high selectivity and a high stopband suppression level, and is suitable for a function fusion design of a 5G millimeter-wave base station antenna.

Embodiment 2

A communication device includes the dual-polarized broadband millimeter-wave filtering antenna based on the meta-surface as described in Embodiment 1.

The above embodiments are preferred embodiments of the present disclosure, but implementations of the present disclosure are not limited by the embodiments. Any other changes, modifications, substitutions, combinations, or simplifications that are made without deviating from the spirit and principle of the present disclosure shall all be equivalent substitutes and shall all fall within the protection scope of the present disclosure.

The invention claimed is:

1. A dual-polarized broadband millimeter-wave filtering antenna based on a meta-surface, comprising two layers of stacked dielectric substrates, wherein an upper surface and a lower surface of a lower-layer dielectric substrate are provided with an upper-layer metal ground and a lower-layer metal ground, respectively; an upper surface of an upper-layer dielectric substrate is provided with a meta-surface structure; the meta-surface structure comprises N metal patches, which are arranged in an array; a slot is etched on each metal patch; the upper-layer dielectric substrate is connected to the upper-layer metal ground; a Jerusalem cross slot is etched on the upper-layer metal ground;

N is equal to four; two slots of a cross slot formed by the four metal patches arranged in an array are parallel to two slots of the Jerusalem cross slot; the meta-surface structure is arranged at a 45-degree included angle with the Jerusalem cross slot to introduce a first zero point of an upper side frequency;

four shorted metal branches, on the upper-layer dielectric substrate, are located on angular bisectors of included angles of the Jerusalem cross slot; long sides of the four shorted metal branches are parallel to the angular bisectors of the included angles to generate a zero point at a lower side frequency and form a lower stopband;

slots etched on each metal patch are two L-shaped slots; and the two L-shaped slots are symmetrical about a diagonal of the metal patch and are perpendicular to adjacent edges of the metal patch, so that a higher-order mode of the meta-surface structure is shifted towards a low frequency to improve the roll-off property of a passband edge; and a second zero point of an upper side frequency is introduced to improve a high-frequency out-of-band suppression level.

2. The dual-polarized broadband millimeter-wave filtering antenna based on the meta-surface according to claim 1, further comprising a metal shorted pin, wherein the shorted metal branches are arranged below the metal patches and are located in the upper-layer dielectric substrate; and one end of the metal shorted pin is connected to the shorted metal branches, and the other end is connected to the upper-layer metal ground.

3. A communication device, comprising the dual-polarized broadband millimeter-wave filtering antenna based on the meta-surface according to claim 1.

4. The dual-polarized broadband millimeter-wave filtering antenna based on the meta-surface according to claim 1, further comprising two coplanar metal strip feeding lines, located directly below the Jerusalem cross slot, wherein the two metal strip feeding lines are orthogonal through a metal bridge of a short strip line.

5. The dual-polarized broadband millimeter-wave filtering antenna based on the meta-surface according to claim 4, wherein an isolation structure is adopted around the metal strip feeding lines and the Jerusalem cross slot.

6. The dual-polarized broadband millimeter-wave filtering antenna based on the meta-surface according to claim 1, wherein a spacing between adjacent metal patches is 0.01 $\lambda g0$ to 0.3 $\lambda g0$, wherein $\lambda g0$ is a dielectric effective wavelength corresponding to a center frequency of the antenna.

* * * * *